US006795208B1

(12) United States Patent
Tanaka

(10) Patent No.: US 6,795,208 B1
(45) Date of Patent: Sep. 21, 2004

(54) PRINTER CONTROLLER AND SYSTEM HAVING A DMA DATA TRANSMISSION

(75) Inventor: Tomonori Tanaka, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 764 days.

(21) Appl. No.: 09/665,060

(22) Filed: Sep. 19, 2000

(30) Foreign Application Priority Data

Oct. 15, 1999 (JP) ............................................ 11-294536

(51) Int. Cl.[7] .............................................. G06F 15/00
(52) U.S. Cl. ..................... 358/1.16; 358/1.15; 358/1.13
(58) Field of Search .............................. 358/1.16, 1.15, 358/1.13, 1.14, 1.17, 1.1, 501, 407; 710/15; 709/217; 382/303, 234; 345/501, 502

(56) References Cited

U.S. PATENT DOCUMENTS 5,859,956 A  *  1/1999  Sugiyama et al. .......... 358/1.13

FOREIGN PATENT DOCUMENTS

| JP | 6-103225 |   | 4/1994  |             |
|----|----------|---|---------|-------------|
| JP | 9-300743 | * | 11/1997 | ... B41J/5/30 |

* cited by examiner

Primary Examiner—Twyler Lamb
(74) Attorney, Agent, or Firm—Oblon, Spivak, McClelland, Maier & Neustadt, P.C.

(57) ABSTRACT

A printer controller and system that include a descriptor storing device which stores descriptor information, an image memory which stores at least one of encoded image data and non-encoded image data, a decoding device which decodes encoded image data, a first data path which transmits the encoded image data stored in the image memory to an external device via the decoding device, and a second data path which transmits the non-encoded image data stored in the image memory to the external device. The printer controller and system further include a direct memory access (DMA) control device that controls the image data stored in the image memory so as to be transmitted via one of the first data path and the second data path according to the descriptor information stored in the descriptor storing device.

13 Claims, 5 Drawing Sheets

PRINTER CONTROLLER AND SYSTEM HAVING A DMA DATA TRANSMISSION

BACKGROUND OF THE INVENTION

1. Field of the Invention

The present invention relates to a printer controller and system having a direct memory access (DMA) data transmission.

2. Discussion of the Background

In recent years, as a digital technology progresses, high definition images have become increasingly popular. In view of this, when a digital image processing apparatus, such as a laser printer, a digital photocopier, etc., processes high definition images, the size and cost of an image memory and the image processing time tend to increase. Therefore, holding down those increases is becoming an important challenge.

As an example, in a digital photocopier provided with an electronic sorter, image data of plural sheets of original documents is first stored in an image memory. Then, the stored image data is read page by page from the image memory and printed on paper, and thus a specified number of sorted copies are completed. For reducing the capacity of image memory, image data is sometimes compressed by a coding method.

When image data is encoded, data compressibility or a data compression ratio, which is a ratio of an encoded data size to the non-encoded or original data size, varies greatly depending upon the contents of the image to be encoded. Therefore, when image data is encoded by a coding method, the data compression ratio may reach a value smaller than one, i.e., the image data is compressed. However, the data compression ratio sometimes exceeds a value of one, i.e., the image data is actually expanded rather than being compressed. Accordingly, for such image data, it is preferable not to encode the image data.

For decreasing an image data size included on a page, the whole area of the page may be divided into plural sub-areas, and each of the sub-areas may be adaptively encoded according to the data compressibility thereof, which generally depends on the contents of the sub-area. Thus, the image data size of the page is minimized. Accordingly, when the adaptively encoded image data of the page is stored in an image memory, the memory size can also be minimized.

Meanwhile, since a demand for increased digital data processing speed in digital devices, such as laser printers, computer systems, etc., has increased, a demand for high-efficient data block transmission by a direct memory access (DMA) controller has also increased.

As an example of DMA controllers, Japanese Laid-Open Patent Publication No. 6-103225 discloses a chain type of DMA controller. In the art, as descriptor information, plural pairs of an addresses and the number of transmission data words corresponding to the plural data blocks are stored in a DMA descriptor area in an external memory in advance of a transmission. During the DMA data transmission, the chain type DMA controller reads the descriptor information, i.e., the plural pairs of the stored data address and the number of transmission data words in turn, and transmits the plural data blocks according to the read information.

As an example of a digital image processing apparatus, Japanese Laid-Open Patent Publication No. 9-300743 discloses an image forming apparatus. In this apparatus, when the capacity of an image memory is larger than an image data size of a page, the uncompressed page image data is transmitted to the image memory by a DMA data transmission. The page image data in the image memory is then transmitted to a printer engine by DMA data transmission to form an image. When the capacity of the image memory is smaller than the image data size of the page, the page image data is compressed and then transmitted to the image memory by DMA data transmission. After that, the page image data stored in the image memory is transmitted to a data expansion device to be expanded, and the expanded data is transmitted to the printer engine by DMA data transmission to form an image.

As stated above, image data on a page generally includes two categories of images. One category can be compressed in a relatively effective manner and the other category cannot be effectively compressed. Further, for using an image memory efficiently, the image memory may be dynamically divided into two or more areas. Likewise, the page image data may also be divided into two or more portions. In that case, the divided memory areas can be dynamically allocated to the divided image data. The divided image data cannot always be stored in continuous addresses of the image memory for an efficient use of the image memory.

In addition, the divided image data may be adaptively encoded according to a data compression ratio of the divided data, respectively, and thus efficiency of use of the memory is increased. When image data is stored in the memory in such manner, image data transmission, for example, from an image input device to the memory, from the memory to an image data output device, etc., is desirably efficiently completed in a short time.

However, the background art does not describe an efficient transmission of image data composed of a plurality of divided image data being encoded and non-encoded stored in an image memory to an external device.

SUMMARY OF THE INVENTION

The present invention has been made in view of the above-discussed and other problems and to overcome the above-discussed and other problems associated with the background methods and apparatus. Accordingly, an object of the present invention is to provide a printer controller and system that can transmit page image data being encoded and non-encoded in a short time so as to form an image at high speed with a relatively small storage capacity of an image memory.

To achieve this and other objects, the present invention provides a novel printer controller and system that include a descriptor storing device which stores descriptor information, an image memory which stores at least one of encoded image data and non-encoded image data, a decoding device which decodes encoded image data, a first data path which transmits the encoded image data stored in the image memory to an external device via the decoding device, and a second data path which transmits the non-encoded image data stored in the image memory to the external device without passing through the decoding device. The printer controller and system further include a direct memory access (DMA) control device that control the image data stored in the image memory so as to be transmitted by passing through either one of the first data path and the second data path according to the descriptor information stored in the descriptor storing device.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
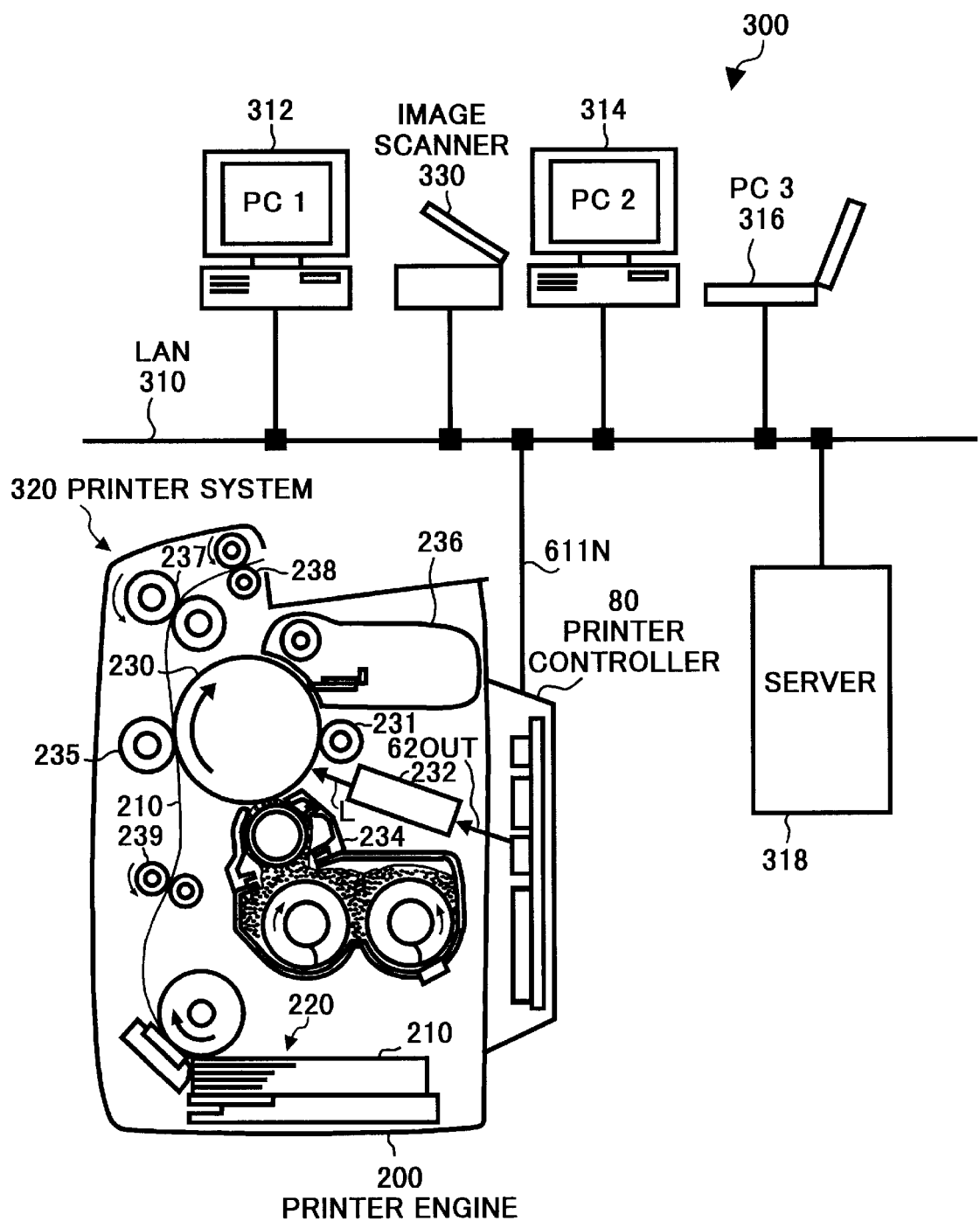
FIG. 1 is a block diagram of a network system including an exemplary printer system configured according to the present invention.

Referring now to the drawings, wherein like reference numerals designate identical or corresponding parts throughout the several views, and more particularly to FIG. 1 thereof, FIG. 1 is a block diagram of a network system 300 including an exemplary printer system 320 configured according to the present invention. The network system 300 includes a local area network (LAN) 310, personal computer 1 (PC 1) 312, personal computer 2 (PC 2) 314, personal computer 3 (PC 3) 316, a server 318, the printer system 320, and an image scanner 330.

The personal computers 312, 314 and 316 are provided with application programs, such as a word processing program, a spreadsheet program, a drawing program, a communication program, etc. Using those programs, the personal computers 312, 314 and 316 generate various print data of documents, such as letters, drawings, etc.

A printer controller 80 and a printer engine 200 are connected by an image data output line 620UT, and other structure, the printer system 320. The printer controller 80 receives print data accompanying a print command from an external apparatus such as the personal computers 312, 314 and 316 via the LAN 310 and a data input line 611N. The printer controller 80 can also receive print data from the image scanner 330 and the server 318. Further, when the LAN 310 is connected to another network such as the Internet, the printer controller 80 can receive print data from a web server connected with the Internet, so that web pages can also be printed by the printer system 320.

In addition, the printer system 320 may be directly connected with a personal computer through the printer controller 80 as a stand-alone printer. The printer system 320 may also be connected to an image scanner through the printer controller 80, and the combined system can function as a digital photocopier.

The printer engine 200 includes an engine control module, a photoconductive drum 230 as an image bearer surrounded by an electrical charging roller 231, a raster scanning module 232, a developing device 234, an image transfer device 235, and a cleaning device 236. The printer engine 200 also includes a register roller pair 239, a fixing device 237, an exit roller pair 238 and a paper feed device 220.

An image forming operation is performed as follows. When the printer controller 80 receives print data accompanying a print command from an external apparatus, the printer controller 80 transmits those command and print data to the engine control module of the printer engine 200. Accordingly, the engine control module activates the photoconductive drum 230 to rotate clockwise. The electrical charging device 231 charges the surface of the photoconductive drum 230 at a substantially uniform voltage. The charged photoconductive drum 230 is then exposed by the raster scanning module 232 with a raster scanning laser beam denoted as "L", according to the received print data. Thus, an electrostatic latent image according to the received print data is formed on the photoconductive drum 230.

Then the developing device 234 develops the electrostatic latent image, and thus a toner image according to the print data is formed on the photoconductive drum 230. The toner image is then conveyed to a position opposing the image transfer device 235. Meanwhile, a sheet of paper 210 is conveyed by the paper feed device 220 to the position where the image transfer device 235 opposes the photoconductive drum 230. While the sheet 210 is conveyed at a substantially identical speed to the circumferential speed of the photoconductive drum 230, a power supply supplies the image transfer device 235 with an appropriate image transfer voltage. Thereby, the toner image on the photoconductive drum 230 is attracted toward the sheet 210 and transferred to the sheet 210.

The sheet 210 having the transferred toner image is further conveyed to the fixing device 237 where the toner image is fixed on the sheet 210, and then the sheet 210 is discharged outside the printer engine 200 as a printed sheet.

Figure 2:
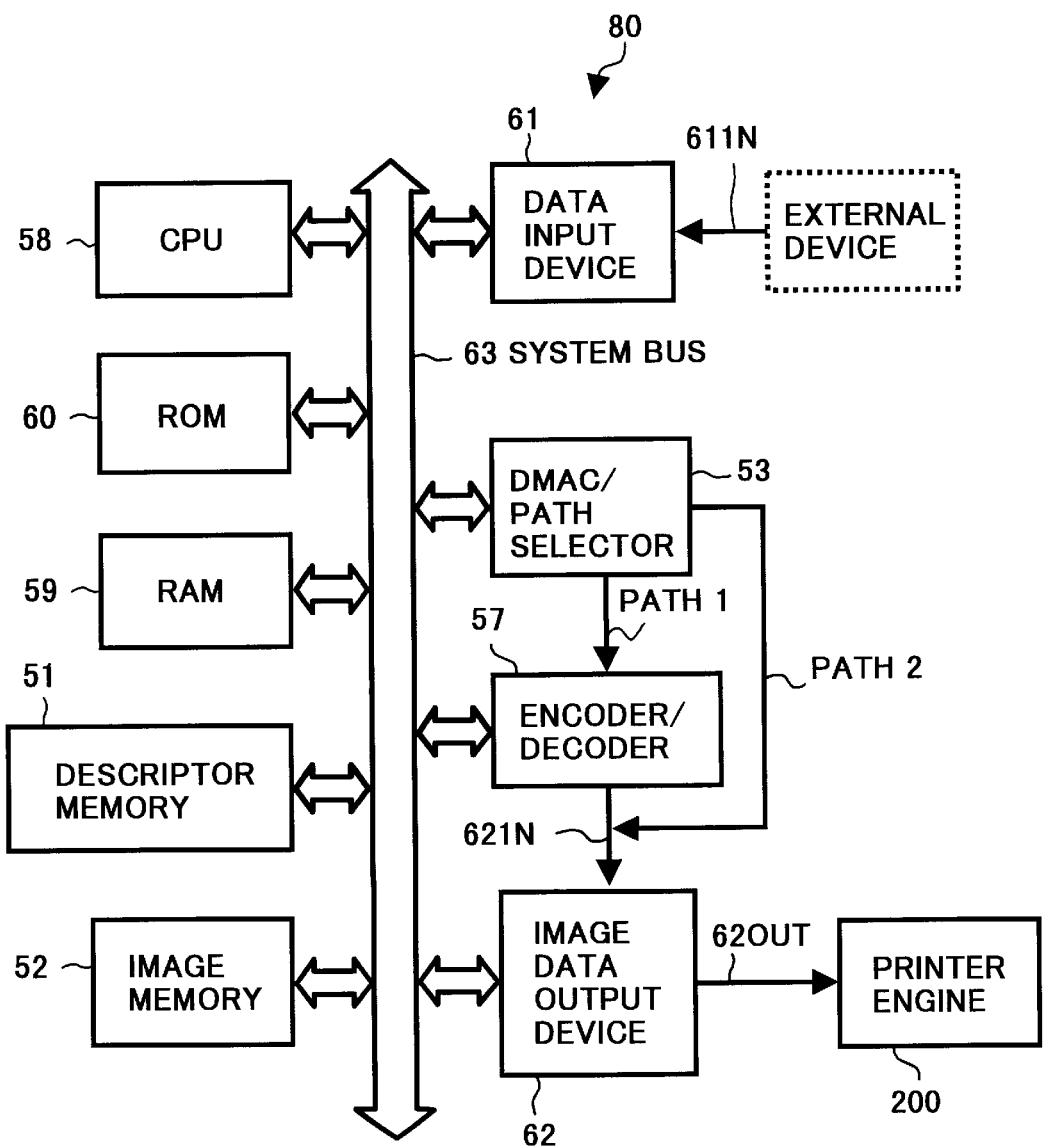
FIG. 2 is a block diagram of an exemplary printer controller configured according to the present invention.

FIG. 2 is a block diagram of the exemplary printer controller 80 configured according to the present invention. Referring to FIG. 2, the printer controller 80 includes a descriptor memory 51, an image memory 52, a direct memory access controller/path selector (DMAC/path selector) 53, an encoder/decoder 57, a random access memory (RAM) 59, a read-only memory (ROM) 60, an data input device 61, an image data output device 62, and a system bus 63. All the devices are connected with the system bus 63.

The system bus 63 transmits image data, address data and control data among the devices being connected with the system bus 63. The DMAC/path selector 53 is also connected with the encoder/decoder 57 via a first data path PATH1 and to the image data output device 62 via a second data path PATH2. The encoder/decoder 57 is connected with the image data output device 62 via an input line 621N, in which the second data path PATH2 merges.

The data input device 61 is provided with the data input line 611N to be connected with an external device, for example, the personal computer 312 via the LAN 310 of FIG. 1. The data input device 61 receives image data and commands from the external device according to a predetermined communication protocol. The image data output device 62 is provided with the image data output line 620UT to be connected with an external device, such as the printer engine 200 of FIG. 1.

The image memory 52 stores both encoded and non-encoded image data. The ROM 60 stores programs or instruction codes executed by the CPU 58 and other constants. The RAM 59 functions as a work memory for the CPU 58, and temporarily stores various data. The descriptor memory 51 stores descriptor information including a chaining address, a start address, a data size and attributes of stored image data in the image memory 52.

The descriptor memory 51, the image memory 52, and the RAM 59 may be configured as a physically single body. In that case, the single memory is freely divided into plural areas, and the divided plural areas can be dynamically allocated to the functions of the descriptor memory 51, the image memory 52, and the RAM 59 according to consequences of data inputting, data processing and outputting operations.

Figure 3:
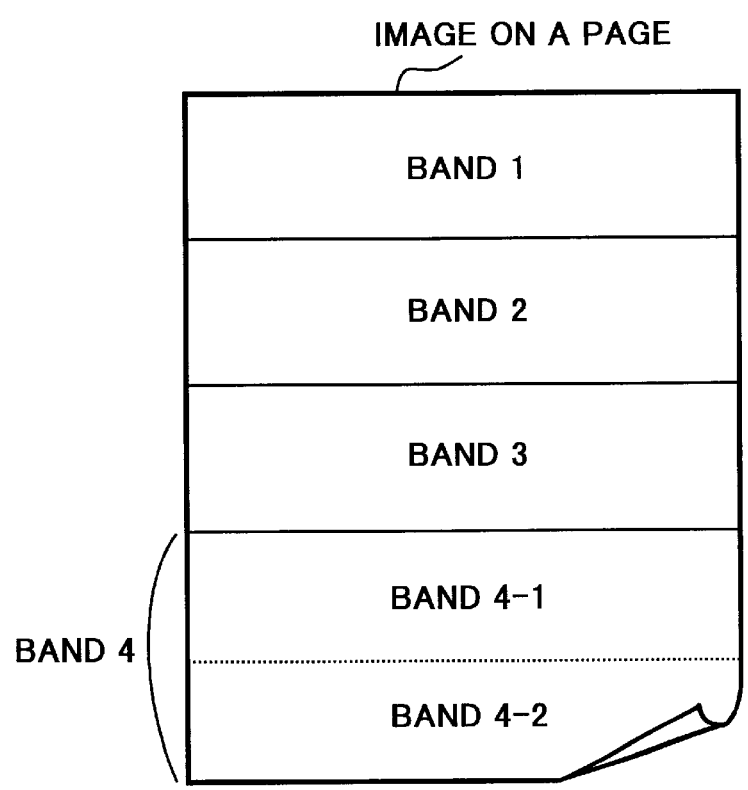
FIG. 3 is a diagram illustrating divided areas of an image.

When the printer controller 80 receives image data via the data input line 611N, the CPU 58 divides the image data into plural areas for using the memories efficiently, saving costs, saving power consumption, saving space, etc. FIG. 3 is a diagram illustrating exemplary divided areas of an image on a page. In this embodiment, each of the divided rectangular areas is referred as a band. In this example, the CPU 58 divides the image data on the page into four bands, i.e., into BAND 1, BAND 2, BAND 3, and BAND 4 as illustrated.

After dividing the image data into BAND 1, BAND 2, BAND 3, and BAND 4, the CPU 58 transmits the image data of the divided bands to the encoder/decoder 57 via the system bus 63 to encode the divided band image data, respectively.

According to the result of the encoding operation, the CPU 58 determines which one of the encoded data and non-encoded data, (i.e., the original data,) should to be stored in the image memory 52 to minimize the capacity of the storing data. The CPU 58 determines this based on a data compression ratio, (i.e., a ratio of an encoded data size to a non-encoded data size,) as regards each of the divided plural bands. When the data compression ratio is smaller than a value of one, i.e., the encoded data size of a band is smaller than the non-encoded data size of the same band, the CPU 58 determines to store the encoded data of the band in the image memory 52. However, when the data compression ratio exceeds a value of one, the CPU 58 determines not to store the encoded image data of the band, but to store the non-encoded data to the image memory 52. But when a data compression ratio is smaller than a value of one and enough capacity to store the non-encoded image data is available, the non-encoded image data may be stored in the image memory 52 instead of the encoded image data.

Regarding the image on the page of FIG. 3, the BAND 1, BAND 3, and BAND 4 are encoded and stored in the image memory 52 because data compression ratios thereof are smaller than a value one. However, data compression ratio of the Band 2 is not smaller than a value one, so that the non-encoded image data thereof is stored in the image memory 52.

Figure 4:
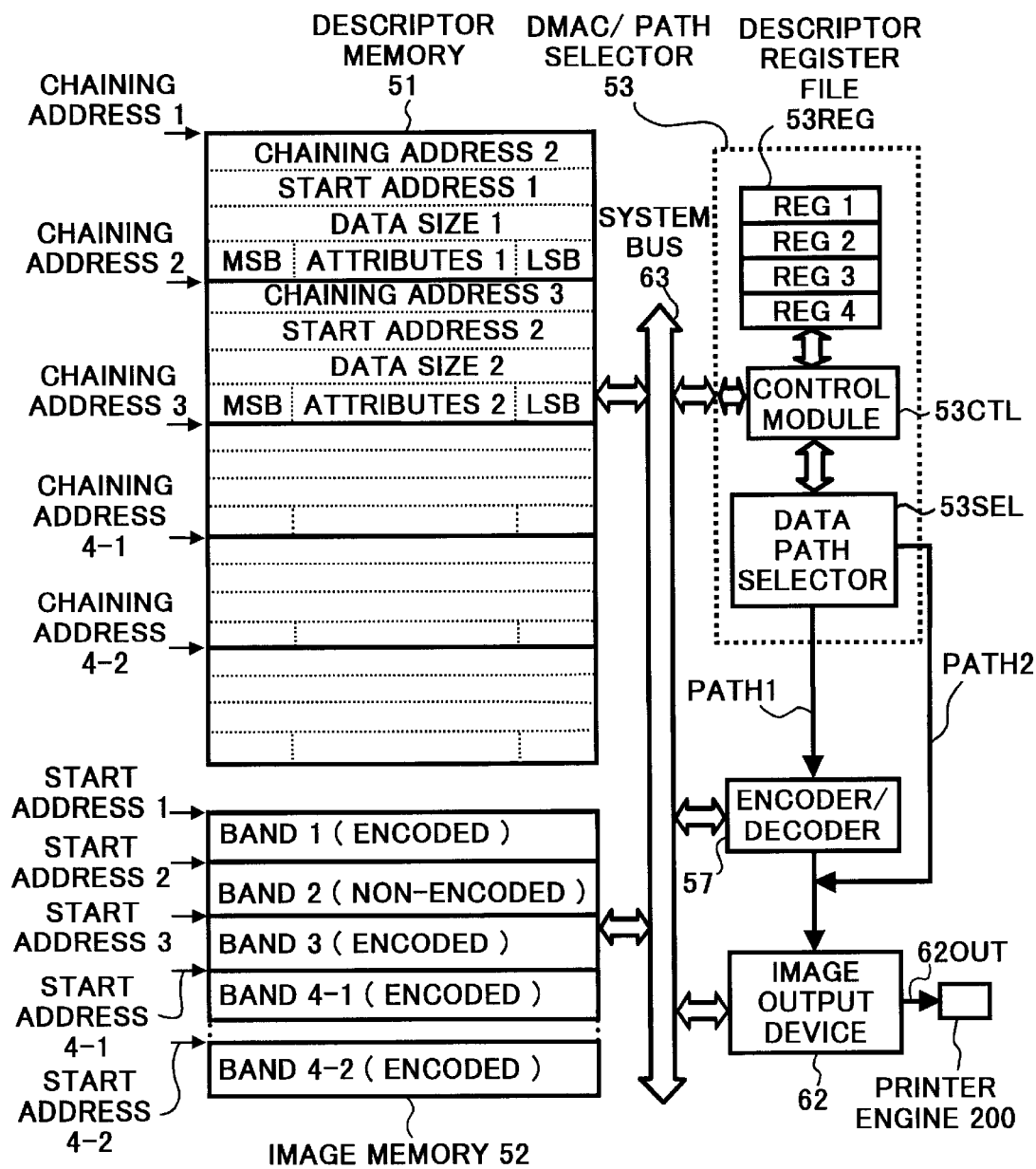
FIG. 4 is a diagram illustrating relations of image data among a DMAC/path selector and other devices as an example configured according to the present invention.

FIG. 4 is a diagram illustrating relations of image data among the DMAC/path selector 53 and other devices as an example configured according to the present invention. With reference to FIG. 3 and FIG. 4, each data compression ratio of BAND 1, BAND 3, and BAND 4 is smaller than a value of one, and therefore encoded data of those bands is stored in the image memory 52 as stated above. Further, the encoded image of the BAND 4 is divided into two bands BAND 4-1 and BAND 4-2 for storing at different locations in the image memory 52 for certain reasons, such as high efficiency use of the image memory 52. On the other hand, the data compression ratio of BAND 2 is not smaller than a value a one; accordingly the non-encoded data of this band is stored in the image memory 52.

In FIG. 4, START ADDRESS 1, START ADDRESS 2, START ADDRESS 3, START ADDRESS 4-1, and START ADDRESS 4-2 denote start addresses or top addresses for storing the image data of BAND 1, BAND 2, BAND 3, BAND 4-1, and BAND 4-2 in the image memory 52, respectively.

For every time the CPU 58 stores those band image data in the image memory 52, the CPU 58 sends the start address or top address, data size and attributes of the storing image data as descriptor information to the descriptor memory 51 to be stored therein. Descriptor information corresponding to a single band is also referred as a descriptor set. Thus, the same number of descriptor sets, i.e., five sets in this example, corresponding to the same number of bands is stored in the descriptor memory 51. With reference to FIG. 4, a descriptor set is configured by four words of CHAINING ADDRESS, START ADDRESS, DATA SIZE, and ATTRIBUTES. Each of the words may be configured by, for example, 64 bits, 32 bits, 16 bits, etc.

The first word CHAINING ADDRESS is a pointer to point an address of a next chaining descriptor set in the descriptor memory 51. For example, the CHAINING ADDRESS in a first descriptor set contains a start or top address of a second descriptor set, the CHAINING ADDRESS in the second descriptor set contains a start address of a third descriptor set, and so forth. Thus, even when a plurality of divided band image data are scattered at different places in the image memory 52, or even in other memories such as the RAM 59 or the descriptor memory 51, a retrieving operation of those band image data into a combined image data is achieved in a relatively short time. The CHAINING ADDRESS also expedites an efficient use of the memories.

The second word START ADDRESS is a pointer to point the start address of the band image data in the image memory 52. The third word DATA SIZE indicates a size of the band image data, or the number of words included in the band image data. The fourth word ATTRIBUTES indicates attributes of the band image data. In this example, the least significant bit (LSB) is assigned for indicating a band data type. When the LSB is zero, the band image data stored in the image memory 52 is encoded data, and when the LSB is one, the band image data is non-encoded data.

As to the image on the page of FIG. 3, the BAND 1, BAND 3, BAND 4-1, and BAND 4-2 are encoded to be stored, and therefore those LSBs of corresponding descriptor sets are set to zero. However, the Band 2 is not encoded, and therefore the LSB of the second descriptor set is set to one.

By the way, certain types of data compression methods refer to a preceding raster line or a preceding image block during an encoding and decoding operation. For example, the MODIFIED READ (MR) coding method and the MODIFIED MODIFIED READ (MMR) coding method, both are known coding methods for facsimile communication, refer to preceding raster lines. However, for the first and other predetermined raster lines, coding operation is executed under a condition that the preceding line is regarded as a white line. Therefore, during a decoding operation, preceding line information, which has been obtained by a previous decoding operation, should remain as has been decoded, or should to be initialized to a white line depending upon the count of decoding raster lines.

In view of the above-discussed matters, the most significant bit (MSB) of the fourth word ATTRIBUTES is assigned for indicating an initializing operation of the encoder/decoder 57 at an end of a decoding operation of encoded image data. When the value of the MSB is zero, the encoder/decoder 57 is initialized at the end of a decoding operation of image data of a band. However, when the value of the MSB is one, the encoder/decoder 57 is not initialized at the end of a decoding operation of the image data of the band. In other words, parameters written in internal registers in the encoder/decoder 57 during a decoding operation of image data of a band is not initialized at the end of the decoding operation of the band image data. Consequently, in a following decoding operation for a following band image data, the parameters remaining in the encoder/decoder 57 are applied for the following decoding operation of a following band.

When encoded image data of a band is stored in continuous addresses of the image memory 52, the MSB is set to zero. On the other hand, when encoded image data of a band is divided into two or more parts (sub-bands), the MSB of the word ATTRIBUTES corresponding a divided sub-band, except the last sub-band of the divided bands, is set to one. Image data of the divided bands can be stored in different locations or in discontinuous addresses of the image memory 52 and other memories. Thereby, the indication of an initializing operation of the encoder/decoder 57 expedites the use of a fragmented memory area and thereby an efficiency of use of the memories is increased.

As to the image on the page of FIG. 3, the BAND 1 and BAND 3 are encoded and then stored, respectively in the image memory 52, and therefore decoding operations thereof are independently performed. Accordingly, the MSB of the ATTRIBUTES of the first descriptor set, and the MSB of the ATTRIBUTES of the third descriptor set are set to zero to initialize the encoder/decoder 57 at the end of a decoding operation of each of image data of those bands.

On the other hand, the BAND 4 is encoded and then the encoded data is divided into two parts BAND 4-1 and BAND 4-2, and therefore decoding operations thereof should not be independently performed. Accordingly, the MSB of the ATTRIBUTES 4-1 is not set to one to initialize the encoder/decoder 57 at the end of a decoding operation of the encoded image data of BAND 4-1. The MSB of the ATTRIBUTES 4-2 is set to zero to initialize the encoder/decoder 57 at the end of a decoding operation of the encoded image data of BAND 4-2 because the BAND 4-2 is the last divided part of the BAND 4.

The Band 2 is not encoded, and so it is irrelevant whether the MSB of the ATTRIBUTES 2 is set to zero or one.

In the above-stated example, the printer controller 80 receives image data in a raster image data format without encoding. However, the printer controller 80 may also receive image data that has already been divided into bands and adaptively encoded, respectively, i.e., encoded or non-encoded according to contents of each band. In that case, the CPU 58 may directly transmit the received image data into the image memory 52 and transmit descriptor information into the descriptor memory 51 via the system bus 63.

Further, the printer controller 80 may also receive print data written in a page description language, such as Post-Script developed by Adobe Systems Inc. of Palo Alto, Calif. In such a case, the CPU 58 first renders a raster image by interpreting the received print data written by a page description language. After that, the CPU 58 can divide the raster image, adaptively encode the divided raster image, and store the divided and encoded or non-encoded image data in the image memory 52 and store descriptor information in the descriptor memory 51.

Now, an image data outputting operation is described in detail as follows. Referring to FIG. 4, the DMAC/path selector 53 includes a control module 53CTL, a descriptor register file 53REG, and a data path selector 53SEL. The control module 53CTL is connected to the system bus 63 and controls factions of the DMAC/path selector 53, such as bus arbitrations. The descriptor register file 53REG includes a first register REG1, a second register REG2, a third register REG3, and a fourth register REG4.

The descriptor register file 53REG is capable of storing contents of a descriptor set, i.e., descriptor information on image data of a band. When a descriptor set in the descriptor memory 51 is loaded into the descriptor register file 53REG, the registers REG1, REG2, REG3 and REG4 store a chaining address, a start address, a data size, and attributes of image data of a band, respectively.

Accordingly, the LSB of the fourth register REG4 corresponds to a data type, i.e., when the LSB is zero, the band image data pointed by the second register REG2 and being stored in the image memory 52 is encoded data. When the LSB is one, the band image data is non-encoded data. Similarly, the MSB of the fourth register REG4 corresponds to an indication of an initializing operation of the encoder/decoder 57 at the end of decoding operation of encoded image data of a band. When the value of the MSB is zero, the encoder/decoder 57 is initialized at the end of a decoding operation of band image data. However, when the MSB is one, the encoder/decoder 57 is not initialized at the end of the decoding operation of the band image data.

The data path selector 53SEL has an input bus connecting to the system bus 63 via the control module 53CTL and two outputs, the first data path PATH1 connecting to the encoder/decoder 57 and the second data path PATH2 connecting to the image data output device 62. When image data of a band is output, either one of the two paths is automatically selected according to a value of the LSB of the fourth register REG4. When the value of the LSB is zero, i.e., the image data is encoded, the first data path PATH1 is selected, and the second data path PATH2 is selected otherwise.

In this example, a broad sense of the term "first data path" includes the path PATH1, the encoder/decoder 57 and the input line 621N. Similarly, a broad sense of the term "second data path" includes the path PATH2 and the input line 621N.

Following an encoding operation and a storing operation in the image memory 52, according to an output command, the CPU 58 loads the first register REG1 with a first chaining address, such as CHAINING ADDRESS 1 of FIG. 4. The CPU 58 then relinquishes the control of the system bus 63 to the DMAC/path selector 53 and transmits the received output command to the DMAC/path selector 53. Consequently, the DMAC/path selector 53 loads the descriptor register file 53REG with a first descriptor set in the descriptor memory 51, whose address is pointed by the chaining address being loaded in the first register REG1 at the moment.

As a result, the descriptor register file 53REG is loaded with a first descriptor set, for example, CHAINING ADDRESS 2, START ADDRESS 1, DATA SIZE 1, and ATTRIBUTES 1 when the first register REG1 has been loaded with CHAINING ADDRESS 1.

After loading the descriptor register file 53REG, the DMAC/path selector 53 starts a DMA data transmission of the band image data starting at an address specified by the second register REG2 as a source address. Further, the LSB of the fourth register REG3 specifies a destination address, i.e., PATH1 or PATH2, and the third register REG2 specifies the number of transmission words. Therefore, when the LSB of the fourth register REG3 is zero, the image data is transmitted to the encoder/decoder 57 where the data is to be decoded, via the first path PATH1. After the image data is decoded, i.e., expanded, the decoded data is transmitted to the image data output device 62. On the other hand, when the LSB is one, the image data is transmitted directly to the image data output device 62 via the second path PATH2, because it is non-encoded data. Thus, the image data of the first band is output from the image data output device 62 to an external device, i.e., the printer engine 200.

In addition, the image data decoded by the encoder/decoder 57 may also be transmitted again to the image memory 52 for temporary buffering, and the stored data is then output via the image data output device 62 to an external device.

When a DMA data transmission of image data of the first band is completed, the DMAC/path selector 53 loads the descriptor register file 53REG with a following descriptor set in the descriptor memory 51, whose address is pointed by the chaining address being loaded in the first register REG1 at that moment. Thus, the following descriptor set is loaded into the descriptor register file 53REG, and the DMAC/path selector 53 starts the DMA data transmission of the image data of the following band.

When the chaining address being loaded in the first register REG1 is null or indicating an end of transmission, a series of the transmission for the all bands is completed.

As to the image data of FIG. 3, after receiving an output command, the CPU 58 loads the first register REG1 with the CHAINING ADDRESS 1 of FIG. 4, and then relinquishes the control of the system bus 63 to the DMAC/path selector 53. Accordingly, the DMAC/path selector 53 loads the descriptor register file 53REG with the first descriptor set, i.e., CHAINING ADDRESS 2, START ADDRESS 1, DATA SIZE 1, and ATTRIBUTES 1. Because the LSB of ATTRIBUTES 1 is zero, the data path selector 53SEL selects the PATH 1 and starts transmission of the image data starting from START ADDRESS 1 in the image memory 52 to the encoder/decoder 57. Receiving the encoded image data, the encoder/decoder 57 decodes the data and outputs the decoded image data to the image output device 62. The DMAC/path selector 53 transmits data whose amount is specified by DATA SIZE 1.

When the DMAC/path selector 53 has completed the transmission of the image data, the DMAC/path selector 53 checks the MSB of ATTRIBUTES 1. Since the MSB is zero, the DMAC/path selector 53 initializes the encoder/decoder 57. For initializing the encoder/decoder 57, the DMAC/path selector 53 transmits a reset signal to the encoder/decoder 57 via the system bus 63, and thereby the encoder/decoder 57 is initialized.

After that, according to the chaining address loaded in the first register REG1 at the moment, i.e., CHAINING ADDRESS 2, the DMAC/path selector 53 loads the descriptor register file 53REG with the second descriptor set, CHAINING ADDRESS 3, START ADDRESS 2, DATA SIZE 2, and ATTRIBUTES 2. The LSB of ATTRIBUTES 2 is one, i.e., the image data is non-encoded, and therefore the data path selector 53SEL selects the PATH 2 and starts transmission of the data starting from START ADDRESS 2 in the image memory 52 directly to the image output device 62. DATA SIZE 2 specifies the transmission data size.

When the DMAC/path selector 53 has completed the transmission of the image data according to the chaining address loaded in the first register REG1, the DMAC/path selector 53 loads the descriptor register file 53REG with the third descriptor set, CHAINING ADDRESS 4-1, START ADDRESS 3, DATA SIZE 3, and ATTRIBUTES 3. The LSB of ATTRIBUTES 3 is zero, and therefore the data path selector 53SEL selects the PATH 1 and starts transmission of the data starting from START ADDRESS 3 in the image memory 52 to the encoder/decoder 57. Receiving the data, the encoder/decoder 57 decodes the encoded image data and outputs the decoded data to the image output device 62.

After completion of the transmission of the image data whose size is specified by DATA SIZE 3, the DMAC/path selector 53 checks the MSB of ATTRIBUTES 3, which is zero. Accordingly, the DMAC/path selector 53 initializes the encoder/decoder 57. Then, according to the chaining address loaded in the first register REG1 at the moment, the DMAC/path selector 53 loads the descriptor register file 53REG with the forth descriptor set, CHAINING ADDRESS 4-2, START ADDRESS 4-1, DATA SIZE 4-1, and ATTRIBUTES 4-1. The LSB of ATTRIBUTES 4-1 is zero, and therefore the data path selector 53SEL selects the PATH 1 and starts transmission of the data starting from START ADDRESS 4-1 in the image memory 52 to the encoder/decoder 57. Receiving the data, the encoder/decoder 57 decodes the data and outputs the decoded data to the image output device 62.

When the DMAC/path selector 53 has completed the transmission of the data whose size is specified by DATA SIZE 4-1, the DMAC/path selector 53 checks the MSB of ATTRIBUTES 4-1, and finds that it is one. Accordingly, the DMAC/path selector 53 does not initialize the encoder/decoder 57. After that, according to the chaining address loaded in the first register REG1, the DMAC/path selector 53 loads the descriptor register file 53REG with the fifth descriptor set, null CHAINING ADDRESS, START ADDRESS 4-2, DATA SIZE 4-2, and ATTRIBUTES 4-2. Since the LSB of ATTRIBUTES 4-2 is zero, the data path selector 53SEL selects the PATH 1 and starts transmission of the data starting from START ADDRESS 4-2 in the image memory 52 to the encoder/decoder 57. Receiving the data, the encoder/decoder 57 decodes the data using decoding parameters remaining in internal registers of the encoder/decoder 57, and outputs the decoded data to the image output device 62. DATA SIZE 4-2 specifies the transmission data size.

When the DMAC/path selector 53 has completed the transmission of the data, the DMAC/path selector 53 checks that the MSB of ATTRIBUTES 4-2 is zero. Consequently, the DMAC/path selector 53 initializes the encoder/decoder 57 by sending a reset signal. After that, the DMAC/path selector 53 checks the first register REG1 and finds CHAINING ADDRESS is null. Accordingly, the DMAC/path selector 53 completes the transmission of all of the bands and relinquishes the control of the system bus 63 to the CPU 58.

In the above stated example, the descriptor memory 51 is configured as an independent memory device. However, the descriptor memory 51 need not be an independent device. For example, the descriptor memory 51 may be a part of the RAM 59. The descriptor memory 51 may also be a part of the image memory 52.

The predetermined first and second bits are not limited to LSB and MSB of the data format, but can be any bit of the data format of descriptor information.

Figure 5:
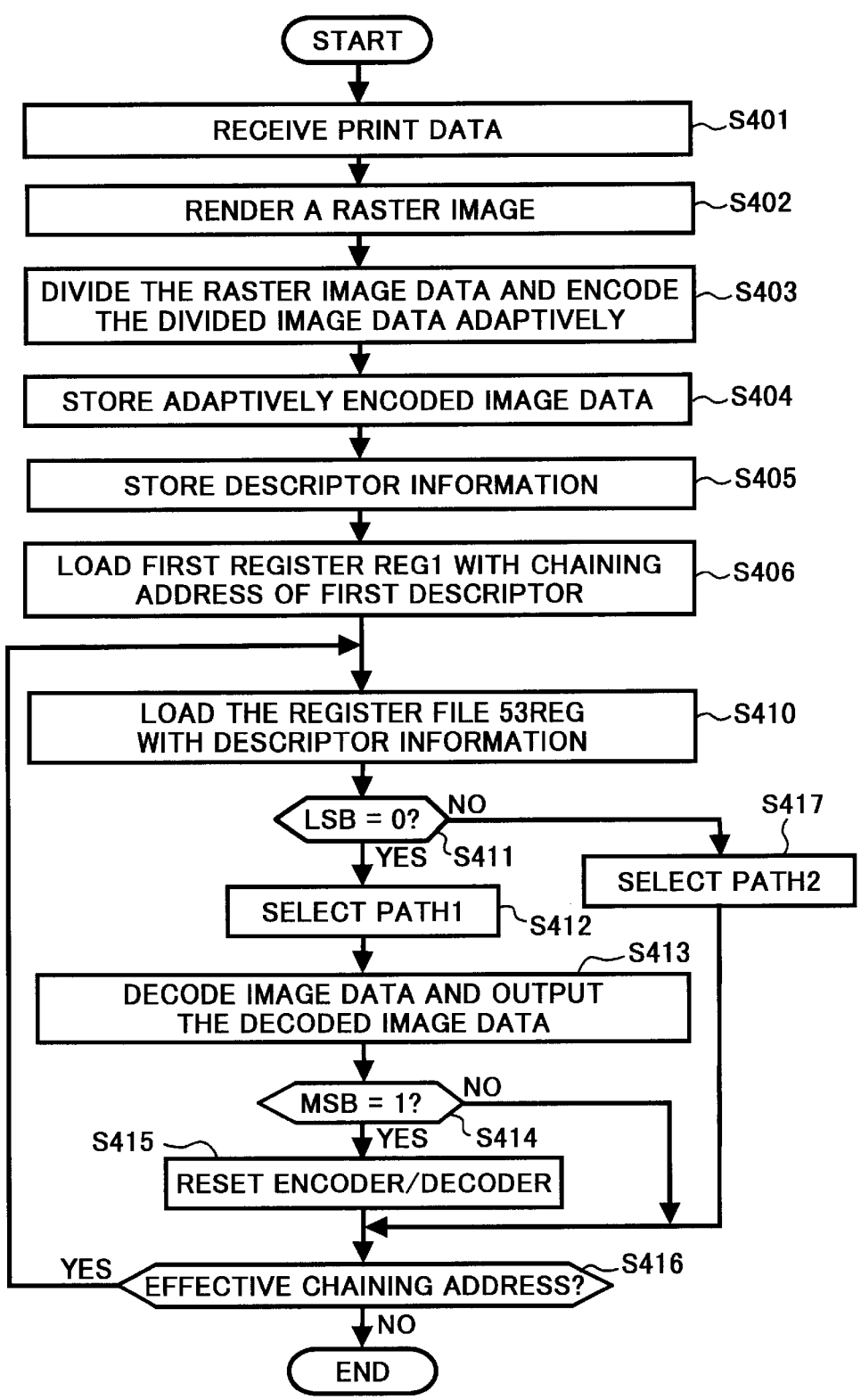
FIG. 5 is a flowchart illustrating operational steps for practicing image printing operation in the printer system of FIG. 1 as an example configured according to the present invention.

FIG. 5 is a flowchart illustrating operational steps for practicing an image printing operation in the printer system of FIG. 1 as an example configured according to the present invention. Referring to FIG. 5, in step S401, the printer controller 80 receives print data written in a page description language. In step S402, the CPU 58 renders a raster image according to the received print data.

In step S403, the CPU 58 divides the raster image data and adaptively encodes the divided image data. In step S404, the CPU 58 stores the divided and adaptively encoded image data in the image memory 52. In step S405, the CPU 58 stores descriptor information in the descriptor memory 51.

In step S406, the CPU 58 loads the first register REG1 of the DMAC/path selector 53 with a chaining address of first descriptor information, and then relinquishes the control of the system bus 63 to the DMAC/path selector 53. In step S410, the DMAC/path selector 53 loads the register file 53REG with the descriptor information stored in the descriptor memory 51 according to a chaining address loaded in the first register REG1 at the moment.

In step S411, the DMAC/path selector 53 determines whether a first predetermined bit in the read descriptor information, i.e., the LSB of the fourth word of the descriptor information, is zero. When the result is true, i.e., YES, in step S411, the process proceeds to step S412, and when the result is false, i.e., No, in step S411, the process branches to step S417.

In step S412, the DMAC/path selector 53 selects the first path PATH1 and starts transmission of band image data stored in the image memory 52 to the encoder/decoder 57 according to the descriptor information. In step S413, the encoder/decoder 57 decodes the image data and outputs the decoded image data to the image output device 62. Thus, the image data is output to an external device.

In step S414, the DMAC/path selector 53 determines whether a second predetermined bit in the read descriptor information, i.e., the MSB of the fourth word of the descriptor information, is zero. When the result is true, i.e., YES, in step S414, the process proceeds to step S415, and when the result is false, i.e., No, in step S414, the process jumps to step S416. In step S415, the DMAC/path selector 53 sends a reset signal to the encoder/decoder 57 so as to be initialized.

In step S416, the DMAC/path selector 53 determines whether the first word of the descriptor information, i.e., a chaining address, contains an effective chaining address. When the result is true, i.e., YES, in step S410, the process returns to step S411, and when the result is false, i.e., No, in step S416, the process is completed.

In step S417, the DMAC/path selector 53 selects the second path PATH 2 and starts transmission of band image data stored in the image memory 52 to the image output device 62 according to the descriptor information. Then, the image data is output to an external device.

As described above, the novel printer controller and system can transmit image data including encoded and non-encoded data of a page in a short time so as to form an image at high speed with a relatively small storage capacity of an image memory.

Obviously, numerous modifications and variations of the present invention are possible in light of the above teachings. For example, features described for certain embodiments may be combined with other embodiments described herein. It is therefore to be understood that within the scope of the appended claims, the invention may be practiced otherwise than as specifically described herein.

This document is based on Japanese patent application No. 11-294536 filed in the Japanese Patent Office on Oct. 15, 1999, the entire contents of which are incorporated herein by reference.

What is claimed as new and is desired to be secured by Letters Patents of the United States:

1. A printer controller comprising:
  a descriptor storing device configured to store descriptor information including attributes of stored image data including band image data;
  an image memory configured to store at least one of encoded image data and non-encoded image data;
  a first data path configured to transmit the encoded image data stored in the image memory to an external device;
  a second data path configured to transmit the non-encoded image data stored in the image memory to the external device; and
  a direct memory access (DMA) control device configured and connected to control the image data stored in the image memory so as to be transmitted via one of the first data path and the second data path according to the descriptor information stored in the descriptor storing device.

2. The printer controller according to claim 1, wherein the DMA control device controls the image data stored in the image memory so as to be transmitted via one of the first data path and the second data path according to a predetermined bit of the descriptor information.

3. The printer controller according to claim 1, wherein the DMA control device controls the image data stored in the image memory so as to be transmitted via one of the first data path and the second data path according to a first predetermined bit of the descriptor inform, and wherein the DMA control device determines whether subsequent transmitting image data following the image data that has been transmitted is a divided part of image data encoded together with the image data that has been transmitted according to a second predetermined bit of the descriptor information.

4. An image forming apparatus comprising:
  a printer controller comprising;
    a descriptor storing device configured to store descriptor information including attributes of stored image data including band image data;
    an image memory configured to store at least one of encoded image data and non encoded image data;
    a first data path configured to transmit the encoded image data stored in the image memory to an external device;
    a second data path configured to transmit the non-encoded image data stored in the image memory to the external device; and
    a direct memory access (DMA) control device configured and connected to control the image data stored in the image memory so as to be transmitted via one of the first data path and the second data path according to the descriptor information stored in the descriptor storing device.

5. The image forming apparatus according to claim 4, wherein the DMA control device of the printer controller comprises registers configured for storing information on encoding of image data.

6. The image forming apparatus according to claim 4, wherein the printer controller further comprises:
  a print data input device configured to receive the image data via the network; and
  a data conversion device configured to divide the received image data, adaptively encode the divided image data, and generate descriptor information for each of the divided image data.

7. The image forming apparatus according to claim 4, wherein the DMA control device of the printer controller comprises registers configured for storing information on encoding of image data.

8. A printer controller comprising:
  means for storing descriptor information including attributes of stored image data including band image data;
  means for storing at least one of encoded image data and non-encoded image data;
  means for transmitting the encoded image data stored in the image data storing means to an external device;

means for transmitting the non-encoded image data stored in the image data storing means to the external device; and means for controlling the image data stored in the image data storing means so as to be transmitted via one of the encoded image data transmitting means and the non-encoded image data transmitting means according to the descriptor information stored in the descriptor storing means.

9. An image forming apparatus comprising:
a printer controller comprising;
means for storing descriptor information including attributes of stored image data including band image data;
means for storing image data;
means for transmitting the encoded image data stored in the image data storing means to an external device;
means for transmitting the non-encoded image data stored in the image data storing means to the external device;
means for controlling the image data stored in the image data storing means so as to be transmitted via one of the encoded image data transmitting means and the non-encoded image data transmitting means according to the descriptor information stored in the descriptor storing means.

10. The image forming apparatus according to claim 9, further comprising:
a printer controller comprising;
means for receiving image data generated by the image data generating means via the networking means;
means for dividing the received image data.

11. The image forming apparatus according to claim 9, further comprising:
storing descriptor information;
storing at least one of encoded image data and non-encoded image data; and
controlling the stored image data so as to be transmitted via one of a first path for decoding encoded image data and transmitting the decoded image data to an external device and a second path for transmitting non-encoded image data to the external device according to the stored descriptor information.

12. A printer system control method comprising:
storing descriptor information including attributes of stored image data including band image data;
storing at least one of encoded image data and non-encoded image data;
decoding encoded image data;
controlling the stored image data so as to be transmitted via one of a first path for decoding encoded image data and transmitting the decoded image data and a second path for transmitting non-encoded image data according to the stored descriptor information;
receiving the image data passed through either one of the first path and the second path;
forming an image on a recording sheet according to the received image data; and
outputting the image formed on the recording sheet outside the image forming apparatus.

13. An image forming apparatus control method comprising:
networking so as to transmit data;
generating image data;
receiving generated image data;
dividing the received image data;
encoding the divided image data adaptively;
generating descriptor information, including attributes of stored image data including band image data, for each of the divided and adaptively encoded image data;
storing the generated descriptor information;
storing the divided and adaptively encoded image data;
controlling the stored image data so as to be transmitted via one of a first path for decoding encoded image data and transmitting the decoded image data and a second path for transmitting non-encoded image data according to the stored descriptor information; and
receiving the image data passed through either one of the first path and the second path.

* * * * *